(12) United States Patent
Monroe et al.

(10) Patent No.: US 11,328,216 B2
(45) Date of Patent: May 10, 2022

(54) QUANTUM NETWORK NODE AND PROTOCOLS WITH MULTIPLE QUBIT SPECIES

(71) Applicant: University of Maryland, College Park, College Park, MD (US)

(72) Inventors: Christopher Monroe, Ellicott City, MD (US); Martin Lichtman, Philadelphia, PA (US); Ismail Volkan Inlek, Cary, NC (US); Clayton Crocker, Hyattsville, MD (US); Ksenia Sosnova, Silver Spring, MD (US)

(73) Assignee: University of Maryland, College Park, College Park, MD (US)

( * ) Notice: Subject to any disclaimer, the term of this patent is extended or adjusted under 35 U.S.C. 154(b) by 0 days.

(21) Appl. No.: 17/145,116

(22) Filed: Jan. 8, 2021

(65) Prior Publication Data
US 2021/0158200 A1    May 27, 2021

Related U.S. Application Data

(63) Continuation of application No. 16/182,219, filed on Nov. 6, 2018, now Pat. No. 10,902,338.
(Continued)

(51) Int. Cl.
*H01J 49/00* (2006.01)
*G06N 10/00* (2022.01)
(Continued)

(52) U.S. Cl.
CPC ............ *G06N 10/00* (2019.01); *B82Y 10/00* (2013.01); *G06F 9/3877* (2013.01);
(Continued)

(58) Field of Classification Search
CPC ...... G06N 10/00; H04B 10/70; H04L 9/0858; H01J 49/422; G06F 9/3877; G06F 9/5027; B82Y 10/00
(Continued)

(56) References Cited

U.S. PATENT DOCUMENTS

| 5,793,091 A | 8/1998 | Devoe |
| 9,858,531 B1 * | 1/2018 | Monroe ................. G06N 10/00 |

(Continued)

OTHER PUBLICATIONS

Wright, et al ("Scalable Quantum Computing Architecture with Mixed Species Ion Chains," URL: https://arxiv.org/pdf/1410.0037.pdf, Oct. 2, 2014, pp. 1-6) (Year: 2014).*
(Continued)

*Primary Examiner* — Michael Maskell
(74) *Attorney, Agent, or Firm* — ArentFox Schiff LLP

(57) ABSTRACT

The disclosure describes aspects of using multiple species in trapped-ion nodes for quantum networking. In an aspect, a quantum networking node is described that includes multiple memory qubits, each memory qubit being based on a $^{171}Yb^+$ atomic ion, and one or more communication qubits, each communication qubit being based on a $^{138}Ba^+$ atomic ion. The memory and communication qubits are part of a lattice in an atomic ion trap. In another aspect, a quantum computing system having a modular optical architecture is described that includes multiple quantum networking nodes, each quantum networking node including multiple memory qubits (e.g., based on a $^{171}Yb^+$ atomic ion) and one or more communication qubits (e.g., based on a $^{138}Ba^+$ atomic ion). The memory and communication qubits are part of a lattice in an atomic ion trap. The system further includes a photonic entangler coupled to each of the multiple quantum networking nodes.

20 Claims, 10 Drawing Sheets

Related U.S. Application Data

(60) Provisional application No. 62/694,604, filed on Jul. 6, 2018, provisional application No. 62/582,529, filed on Nov. 7, 2017.

(51) Int. Cl.

| | | |
|---|---|---|
| *H01J 49/42* | (2006.01) | |
| *G06F 9/38* | (2018.01) | |
| *G06F 9/50* | (2006.01) | |
| *B82Y 10/00* | (2011.01) | |
| *H04B 10/70* | (2013.01) | |
| *H04L 9/08* | (2006.01) | |

(52) U.S. Cl.
CPC .......... *G06F 9/5027* (2013.01); *H01J 49/422* (2013.01); *H04B 10/70* (2013.01); *H04L 9/0858* (2013.01)

(58) Field of Classification Search
USPC ................................................. 250/281, 251
See application file for complete search history.

(56) References Cited

U.S. PATENT DOCUMENTS

| 2015/0055961 A1* | 2/2015 | Meyers ................. H04B 10/50 398/140 |
|---|---|---|
| 2020/0116623 A1* | 4/2020 | Cooper-Roy ............. H03L 7/26 |

OTHER PUBLICATIONS

Cirac et al., "Quantum Computations with Cold Trapped Ions", American Physical Society, (1995), vol. 74, No. 20, pp. 4091-4094.
Sorensen et al., "Entanglement and Quantum Computation with Ions in Thermal Motion", American Physical Society, (2000), vol. 62, pp. 022311-1-022311-11.
Blatt et al., "Entangled States of Trapped Atomic Ions", Nature, (2008), vol. 453, pp. 1008-1015.
Kimble, "The Quantum Internet", Nature, (2008), vol. 453, pp. 1023-1030.
Duan et al., "Colloquium: Quantum Networks with Trapped Ions", American Physical Society, (2010), vol. 82, pp. 1209-1224.
Nickerson et al., "Topological Quantum Computing with a Very Noisy Network and Local Error Rates Approaching One Percent", Nature Communications, (2013), vol. 4:1756, pp. 1-5.
Home, "Quantum Science and Metrology with Mixed-Species Ion Chains", Advances in Atomic, Molecular, and Optical Physics, (2013), vol. 62, pp. 1-30.
Monroe et al., "Large-Scale Modular Quantum-Computer Architecture with Atomic Memory and Photonic Interconnects", American Physical Society, (2014), vol. 89, pp. 022317-1-022317-16.
Moehring et al., "Entanglement of Single-Atom Quantum Bits at a Distance", Nature, (2007), vol. 449, pp. 68-72.
Hucul et al., "Modular Entanglement of Atomic Qubits Using Photons and Phonons", Nature Physics, (2015), vol. 11, pp. 37-42.
Schmidt et al., "Spectroscopy Using Quantum Logic", Science, (2005), vol. 309, pp. 749-753.
Tan et al., "Multi-Element Logic Gates for Trapped-Ion Qubits", Nature, (2015), vol. 528, pp. 380-384.
Debnath et al., "Demonstration of a Small Programmable Quantum Computer with Atomic Qubits", Nature, (2016), vol. 536, pp. 63-72.
Olmschenk et al., "Manipulation and Detection of a Trapped Yb+ Hyperfine Qubit", American Physical Society, (2007), vol. 76, pp. 052314-1-052314-9.
Kleczewski et al., "Coherent Excitation of the 6S1/2 to 5D3/2 Electric-Quadrupole Transition in 138Ba+", American Physical Society, (2012), vol. 85, pp. 043418-1-043418-5.
Wang et al., "Single-Qubit Quantum Memory Exceeding 10-Minute Coherence Time", Nature Photonics, (2017), vol. 11, pp. 1-6.
Inlek et al., "Supplemental Material", (to Multispecies Trapped-Ion Node for Quantum Networking), American Physical Society, (2017), vol. 118, pp. 250502-1-250502-5.
Lin et al., "Sympathetic Electromagnetically-Induced-Transparency Laser Cooling of Motional Modes in an Ion Chain", American Physical Society, (2013), vol. 110, pp. 153002-1-153002-5.
Morigi, "Cooling Atomic Motion with Quantum Interference", American Physical Society, (2003), vol. 67, pp. 033402-1-033402-9.
Blinov et al., "Observation of Entanglement Between a Single Trapped Atom and a Single Photon", Nature, (2004), vol. 428, pp. 153-157.
Auchter et al., "Ion-Photon Entanglement and Bell Inequality Violation with 138Ba+", Journal of the Optical Society of America B, (2013), vol. 31, No. 7, pp. 1-5.
Olmschenk, "Quantum Teleportation Between Distant Matter Qubits", A dissertation submitted in partial fulllment of the requirements for the degree of Doctor of Philosophy (Physics) in The University of Michigan, (2009), pp. 1-209.
Kim et al., "Efficient Collection of Single Photons Emitted from a Trapped Ion into a Single-Mode Fiber for Scalable Quantum-Information Processing", American Physical Society, (2011), vol. 84, pp. 063423-1-063423-10.
Leibfried et al., "Quantum Dynamics of Single Trapped Ions", American Physical Society, (2003), vol. 75, pp. 281-324.
Lee et al., "Engineering Large Stark Shifts for Control of Individual Clock State Qubits", American Physical Society, (2016), vol. 94, pp. 042308-1-042308-7.
Hayes et al., "Entanglement of Atomic Qubits Using an Optical Frequency Comb", American Physical Society, (2010), vol. 104, p. 140501-1-140501-4.
Islam et al., "Beat Note Stabilization of Mode-Locked Lasers for Quantum Information Processing", Optical Society of America, (2014), vol. 39, No. 11, pp. 3238-3241.
Campbell et al., "Ultrafast Gates for Single Atomic Qubits", American Physical Society, (2010), vol. 105, pp. 090502-1-090502-4.
Auchter et al., "Measurement of the branching fractions and lifetime of the 5D5/2 level of Ba+", American Physical Society, (2014), vol. 90, pp. 060501-1-060501-4.
Zhu et al., "Trapped Ion Quantum Computation with Transverse Phonon Modes", American Physical Society, (2006), vol. 97, pp. 050505-1-050505-4.
Ballance et al., "Hybrid Quantum Logic and a Test of Bell's Inequality Using Two Different Atomic Isotopes", Nature, (2015), vol. 528, pp. 384-387.
Hayes et al., "Coherent Error Suppression in Multiqubit Entangling Gates", American Physical Society, (2012), vol. 109, pp. 020503-1-020503-5.
Inlek et al., "Multispecies Trapped-Ion Node for Quantum Networking", (2016), pp. 1-146.
Lee et al., "Phase Control of Trapped Ion Quantum Gates", Journal of Optics B: Quantum and Semiclassical Optics, (2005), vol. 7, pp. S371-S383.
Inlek et al., "Quantum Gates with Phase Stability Over Space and Time", American Physical Society, (2014), vol. 90, pp. 042316-1-042316-8.
Olmschenk et al., "Quantum Teleportation Between Distant Matter Qubits", Science, (2009), vol. 323, pp. 486-489.
Van Rynbach et al., "An Integrated Mirror and Surface Ion Trap with a Tunable Trap Location", Applied Physics Letters, (2016), vol. 109, pp. 221108-1-221108-5.
Maunz, "High Optical Access Trap 2.0", Sandia National Laboratories, (2016), version 1, pp. 1-88.
Inlek et al., "Multispecies Trapped-Ion Node for Quantum Networking", American Physical Society, (2017), vol. 118, pp. 250502-1-250502-5.
Wright, et al., Scalable Quantum Computing Architecture with Mixed Species Ion Chains, https://arxiv.org/pdf/1410.0037.pdf, Oct. 2, 2014, pp. 1-6.
International Written Opinion corresponding to International Application No. PCT/US2018/059656, dated Dec. 29, 2019.
Monroe, et al., "Scaling the Ion Trap Quantum Processor", Science, Mar. 8, 2013, vol. 339, pp. 1164-1169.

(56) References Cited

OTHER PUBLICATIONS

International Search Report and Written Opinion corresponding the International Application No. PCT/US2018/059656, dated Feb. 20, 2019.

Brown, et al., "Co-designing a scalable quantum computer with trapped atomic ions", NPJ Quantum Information, Nov. 8, 2016, pp. 1-10.

* cited by examiner

QUANTUM NETWORK NODE AND PROTOCOLS WITH MULTIPLE QUBIT SPECIES

CROSS REFERENCE TO RELATED APPLICATIONS

The present application is a continuation of U.S. Ser. No. 16/182,219, filed Nov. 6, 2018, now U.S. Pat. No. 10,902,338 and entitled "QUANTUM NETWORK NODE AND PROTOCOLS WITH MULTIPLE QUBIT SPECIES," which in turn claims priority to and the benefit of U.S. Provisional Patent Application No. 62/582,529, entitled "QUANTUM NETWORK NODE AND PROTOCOLS WITH MULTIPLE QUBIT SPECIES," and filed on Nov. 7, 2017, and also claims priority to and the benefit of U.S. Provisional Patent Application No. 62/694,604, entitled "QUANTUM NETWORK NODE AND PROTOCOLS WITH MULTIPLE QUBIT SPECIES," filed on Jul. 6, 2018, the contents of each of which are incorporated herein by reference in their entirety.

GOVERNMENT LICENSE RIGHTS

This invention was made with government support under W911NF1520067 awarded by the U.S. Army Research Laboratory (ARL) and FA95501610421 awarded by the Air Force Office of Scientific Research (AFOSR). The government has certain rights in the invention.

BACKGROUND OF THE DISCLOSURE

Aspects of the present disclosure generally relate to quantum information processing, and more specifically, to techniques for using multiple species in a trapped-ion node for quantum networking.

Trapped atomic ions is one of the quantum information processing (QIP) approaches that has delivered universal and fully programmable machines. Trapped atomic ions are also a leading platform for quantum information networks (QINs). Systems or networks based on trapped atomic ions that can improve the overall communications of such systems or networks are desirable.

SUMMARY OF THE DISCLOSURE

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

Trapped atomic ions are a leading platform for QINs, with long-lived identical qubit memories that can be locally entangled through their Coulomb interaction and remotely entangled through photonic channels. To perform both local and remote operations in a single node of a quantum network requires extreme isolation between spectator qubit memories and qubits associated with the photonic interface. This disclosure describes how to achieve this isolation by co-trapping $^{171}Yb^+$ and $^{138}Ba^+$ qubits in a same node. This disclosure further describes the requirements of a scalable ion trap network node based on the results of two distinct experiments that consist of entangling the mixed species qubit pair through their collective motion and entangling a $^{138}Ba^+$ qubit with an emitted visible photon.

In an aspect of this disclosure, a quantum networking node for use in a modular optical architecture for quantum computing is described that includes multiple memory qubits, each memory qubit being based on a $^{171}Yb^+$ atomic ion, and one or more communication qubits, each communication qubit being based on a $^{138}Ba^+$ atomic ion. The multiple memory qubits and the one or more communication qubits may be part of a lattice in an atomic ion trap.

In another aspect of this disclosure, a quantum computing system having a modular optical architecture is described that includes multiple quantum networking nodes and a photonic entangler coupled to each of the multiple quantum networking nodes. Each quantum networking node includes multiple memory qubits, each memory qubit being based on a $^{171}Yb^+$ atomic ion, and one or more communication qubits, each communication qubit being based on a $^{138}Ba^+$ atomic ion. The multiple memory qubits and the one or more communication qubits may be part of a lattice in an atomic ion trap.

BRIEF DESCRIPTION OF THE DRAWINGS

The appended drawings illustrate only some implementation and are therefore not to be considered limiting of scope.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Trapped atomic ions are among the most advanced platforms for quantum information networks (QINs), hosting qubit memories that are inherently identical and have unrivaled coherence properties. A single node of the network may be realized with a chain of trapped ions, where local entangling gate operations use external control fields that couple the qubit states through their collective motion. Edges of the network can then be implemented by photonic entangling operations between select "communication" qubits in separate nodes. However, the photonic interface for the communication qubits may not disturb the spectator memory qubits, as even a single resonant photon can destroy the quantum memory. Such isolation is best accomplished by using two different species of atomic ions: one for local processing and memory, the other for communicating with other nodes, as shown in FIG. 1.

Figure 1:
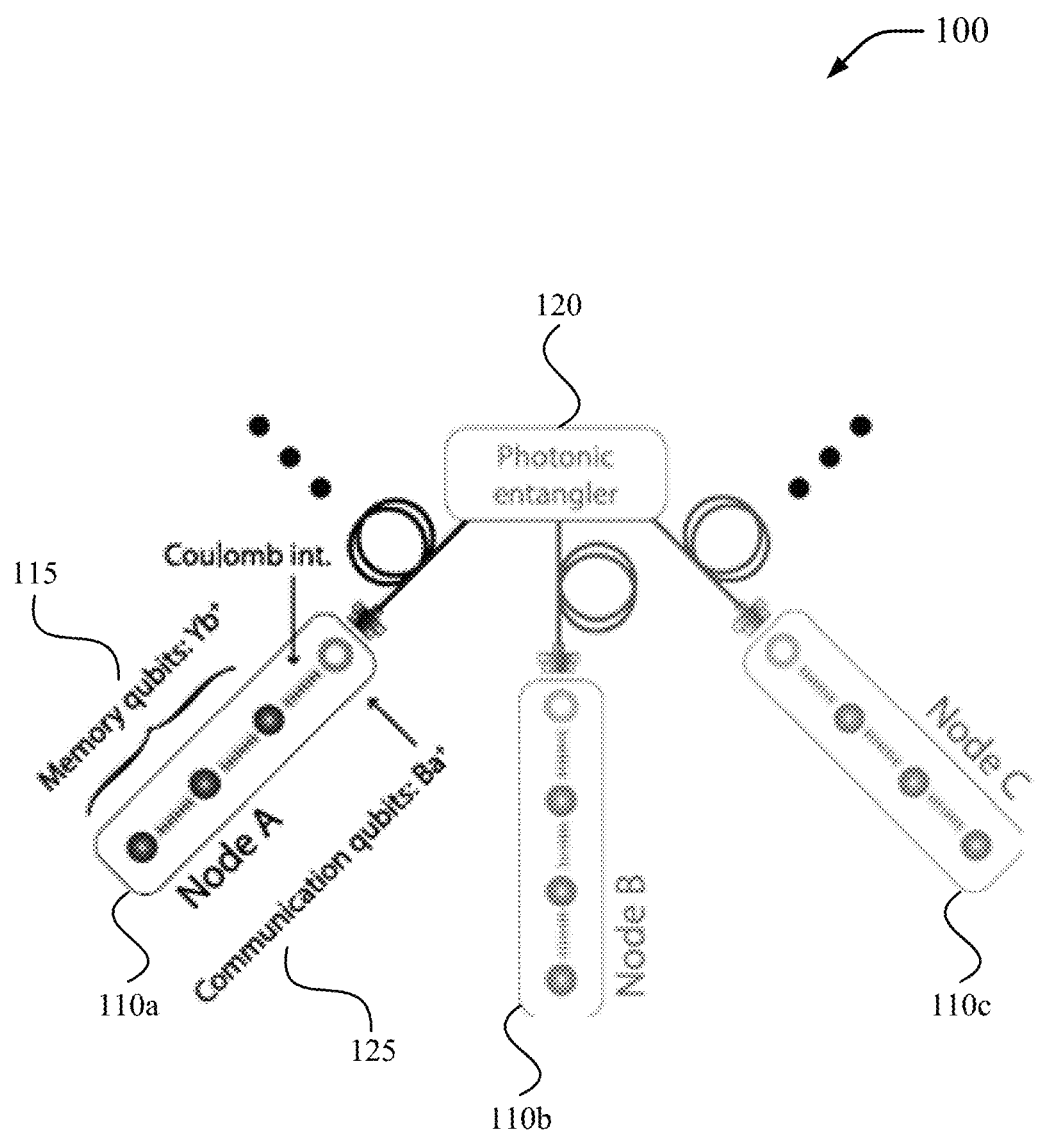
FIG. 1 is a diagram that illustrates an example of a multi-species ion trap network, in accordance with aspects of this disclosure.

FIG. 1 shows a diagram 100 with a multispecies ion trap network in which $^{138}Ba^+$ communication qubits 125 are coupled to optical fibers. Using photons entangled with their parent atoms, any pair of $^{138}Ba^+$ qubits in different nodes 110a, 110b, and 110c, for example, can be entangled through a reconfigurable photonic entangler 120. Local Coulomb interactions mediate transfer of this entanglement to nearby $^{171}Yb^+$ memory qubits 115 as well as quantum logic gates within the node. The disparate or different electronic transition frequencies of the two species (e.g., the $^{171}Yb^+$ memory qubits 115 and the $^{138}Ba^+$ communication qubits 125) provides the necessary isolation to protect $^{171}Yb^+$ memory qubits 115 from resonant processes in the $^{138}Ba^+$ photonic interface.

This disclosure describes different ingredients or requirements of a multispecies ion trap node for use in a potential quantum network. These requirements can include coherent quantum state mapping between memory and communication qubits, and the generation of photonic qubits entangled with the communication qubits. For example, the memory qubits are encoded in the $^2S_{1/2}$ ground state hyperfine "clock" levels of the $^{171}Yb^+$ atomic ions, $|F=0, m_F=0\rangle \equiv |\Downarrow\rangle$ and $|F=1, m_F=0\rangle \equiv |\Uparrow\rangle$. For the communication qubits, this disclosure proposes the use of the $^2S_{1/2}$ ground state electron spin levels of the $^{138}Ba^+$ atomic ions, $|J=\frac{1}{2}, m_J=-\frac{1}{2}\rangle \equiv |\downarrow\rangle$ and $|J=\frac{1}{2}, m_J=+\frac{1}{2}\rangle \equiv |\uparrow\rangle$. The $^{138}Ba^+$ system features relatively long wavelength photon emission lines (e.g., 493 nanometers (nm) and 650 nm), easing the technological requirements for the photonic interfaces and providing the necessary isolation from the $^{171}Yb^+$ resonance at 369 nm. The disclosure describes verification of the isolation between these two species by observing that the measured coherence time of the $^{171}Yb^+$ qubits (~1.5 seconds) is not affected by fluorescence or the driving laser light associated with a continuously Doppler-cooled $^{138}Ba^+$ qubit that is positioned just a few microns away. With the application of dynamical decoupling pulses, a $^{171}Yb^+$ hyperfine qubit coherence time exceeding 10 minutes has been reported in a similar setup where a nearby $^{138}Ba^+$ ion is used for sympathetic cooling.

A standard spin-dependent fluorescence collection may be used for the near-perfect single-shot detection of the $^{171}Yb^+$ qubit state. The $^{138}Ba^+$ ion qubit lacks such an isolated cycling transition, therefore, to detect the $^{138}Ba^+$ qubit state many identical are averaged. This lack of an isolated cycling transition is not a problem in the multispecies network architecture because the $^{138}Ba^+$ qubits are being used only as a link between $^{171}Yb^+$ memory qubits. Once the $^{138}Ba^+$ qubit is mapped to neighboring $^{171}Yb^+$ memories through Coulomb-based gates, quantum information processing need not rely on the state detection of the $^{138}Ba^+$ communication qubits. Nevertheless, implementing a state measurement technique is still useful for a calibration and diagnostics of the $^{138}Ba^+$ system.

In addition to their use as photonic communication qubits, $^{138}Ba^+$ ions can be employed for sympathetic cooling of the $^{171}Yb^+$ qubits to maintain occupation in low motional phonon eigenstates for higher fidelity quantum operations. An electromagnetically-induced transparency (EIT) cooling technique can be implemented using 493 nm laser beams that are tuned to about 120 MHz blue of the $^2S_{1/2}$-$^2P_{1/2}$ transition. The laser beams introduce a narrow atom-laser dressed state resonance where the red-sideband transitions are selectively excited, while blue-sideband and carrier transitions are suppressed. With this technique, it may be possible to cool the motion of a $^{138}Ba^+$ and $^{171}Yb^+$ two ion crystal to $\bar{n} \approx 0.06$ (out-of-phase mode) and $\bar{n} \approx 0.1$ (in-phase mode).

Communication qubits may not require long coherence times, as the information can be quickly transferred to memory qubits, where it can be stored and used later. The short coherence time of Zeeman $^{138}Ba^+$ qubits due to high magnetic field sensitivity of about 2.8 kHz/mG, however, might result in errors during the information transfer operation. It is possible to use an arbitrary waveform generator to apply a magnetic field at 60 Hz and higher harmonics with full phase and amplitude control to partially cancel the background magnetic field. This technique may increase the $^{138}Ba^+$ coherence time from 100 microseconds (μs) to approximately 4 milliseconds (ms), which is much longer than any transfer operation gate times.

A photonic interface can be demonstrated by entangling the $^{138}Ba^+$ qubit with an emitted photon through a postselection procedure. For example, in about 1 μs, the qubit can be initialized to the $|\downarrow\rangle$ state and weakly excite it to the $^2P_{1/2}|J=\frac{1}{2}, m_J=+\frac{1}{2}\rangle$ level with probability $P_{exc} \approx 10\%$. To achieve an average experimental repetition rate of ~500 kHz, 50 μs of Doppler cooling light may be applied after 50 entanglement attempts. After the excitation, the atom decays back to the $|\downarrow\rangle$ state emitting a $\sigma^+$-polarized photon, or to the $|\downarrow\rangle$ state emitting a $\pi$-polarized photon. The photons perpendicular to the quantization axis are collected; therefore, $\pi$ photons are registered as vertically polarized in this basis ($|V\rangle$), while $\sigma^+$ photons are registered as horizontally polarized ($|H\rangle$). Given that a photon is collected, this ideally results in an entangled state between the $^{138}Ba^+$ qubit and the photon polarization qubit, $|\downarrow\rangle|V\rangle + |\uparrow\rangle|H\rangle$.

Figure 2A:
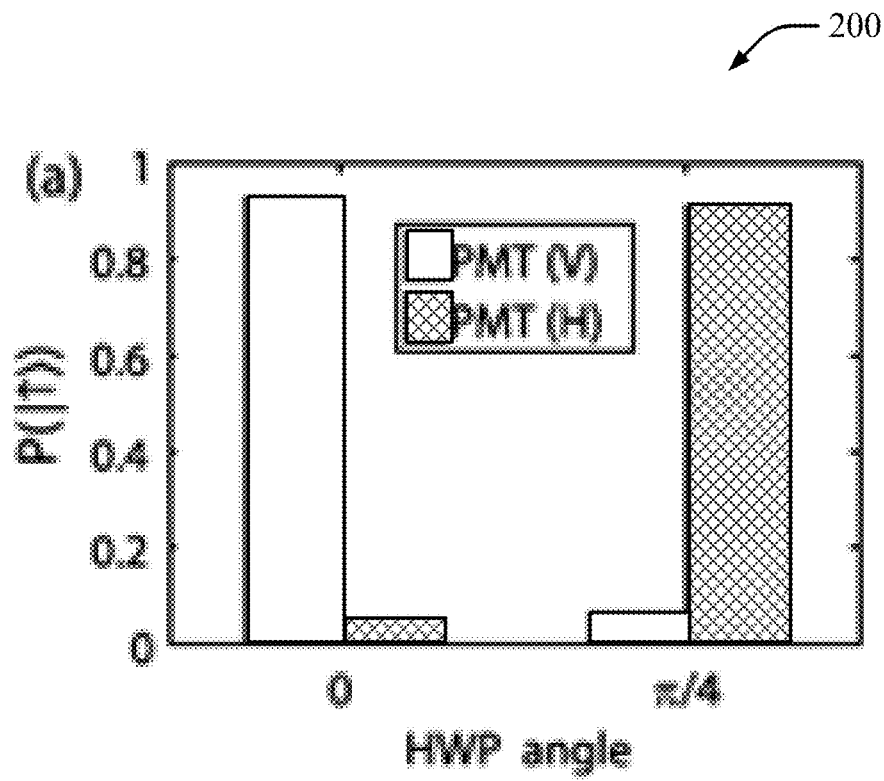
FIGS. 2(a) and 2(b) are diagrams that illustrate examples of correlations between $^{138}Ba^+$ qubit and emitted photon polarizations in multiple bases, in accordance with aspects of this disclosure.
Figure 2B:
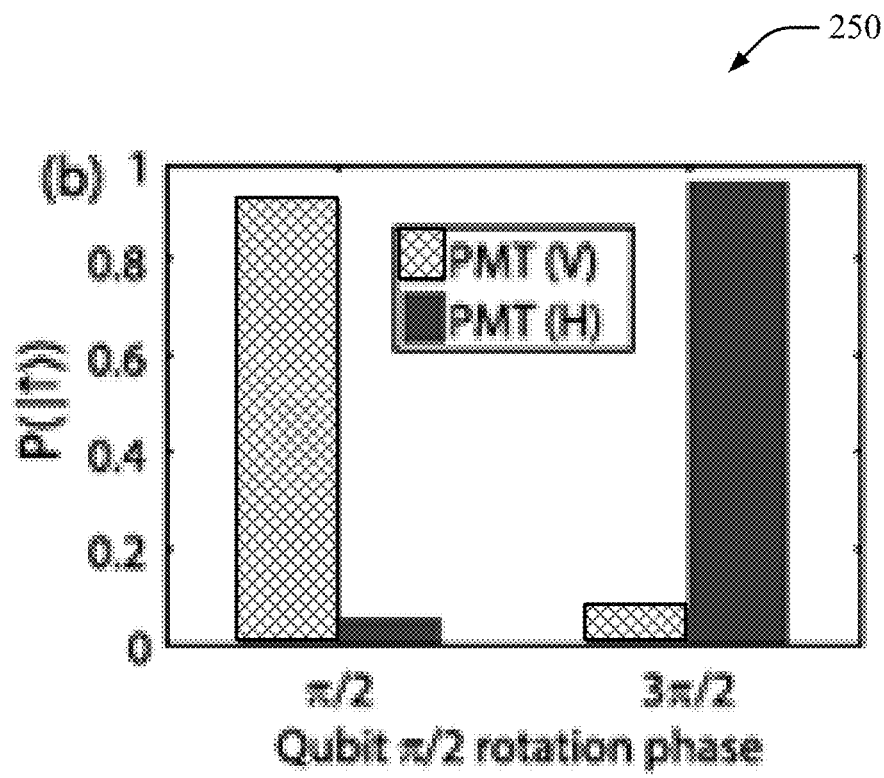

FIGS. 2(a) and 2(b) show the correlations between the $^{138}Ba^+$ qubit and the emitted photon polarization in multiple bases. More particularly, FIGS. 2(a) and 2(b) show correlation measurements between atom and photon qubit states in multiple bases, and from these measurements it may be possible to infer the (postselected) entanglement fidelity to be $\mathcal{F} \geq 0.86$. The errors may be attributed to polarization mixing due to the large solid angle (10%), multiple photon scattering in the excitation step (e.g., $P_{exc}/4 = 2.5\%$), and imperfect state initialization or detection (e.g., 1%). These error sources can be significantly reduced by collecting photons along the quantization axis and using pulsed lasers for fast excitation of the atom.

Referring back to FIG. 2(a), a diagram 200 shows the measured probability of finding a $^{138}$Ba$^+$ qubit in $|\downarrow\rangle$ conditioned upon detecting photon qubit states $|V\rangle$ (light blue) or $|H\rangle$ (dark red) by using a photo multiplier tube (PMT). A half wave plate (HWP) rotates the photonic qubit, and the data show two measurements corresponding to HWP angles of 0 and π/4.

Referring back to FIG. 2(b), a diagram 250 shows the photon polarization being rotated by fixing the HWP at π/8 so that $|H\rangle \rightarrow |H\rangle - |V\rangle$ and $|V\rangle \rightarrow |H\rangle + |V\rangle$. Subsequent photon detection projects the atom to a superposition $(|\downarrow\rangle + |\uparrow\rangle)|H\rangle + (|\downarrow\rangle - |\uparrow\rangle)|V\rangle$. Then, following detection of a $|V\rangle$ or a $|H\rangle$ photon, atomic superposition states are coherently rotated to $|\downarrow\rangle$ and $|\uparrow\rangle$ with a π/2 rotation having a phase of either π/2 or 3π/2, recovering high correlations between the qubit and the photon.

In addition to the aspects described above, this disclosure further describes a deterministic quantum gate between the two species in a quantum networking node. Coherent Raman transitions can be driven in both atomic ions (e.g., in both species of atomic ions) using a single laser for the coherent exchange of information between the $^{171}$Yb$^+$ and $^{138}$Ba$^+$ qubits. Further described below are a direct Cirac-Zoller (CZ) mapping process by resonantly coupling to the collective motion of the trapped ions and a dispersive Mølmer-Sørensen (MS) quantum gate between the qubits.

A Nd:YVO4 mode-locked pulsed laser (Spectra-Physics Vanguard) may be used to introduce non-copropagating Raman beams (e.g., beam propagating in different directions) that can drive transitions between different vibrational eigenmodes and qubit states. As shown in a diagram 300 in FIG. 3, these beams off-resonantly couple to excited levels, where the frequency tripled 355 nm output is used for the $^{171}$Yb$^+$ system, while the frequency doubled 532 nm output from the same laser is used for the $^{138}$Ba$^+$ system. Stimulated Raman transitions are driven when the beat-note frequency between two beams is near the qubit splitting. Linear polarizations that are all perpendicular to the quantization axis may be chosen, allowing desired Raman transitions to be driven while minimizing differential ac Stark shifts on each species. The large bandwidth of the frequency comb easily spans the $^{171}$Yb$^+$ qubit frequency of 12.642821 GHz for Raman rotations. In order to stabilize the beat-note frequency of two Raman beams, a feed-forward technique may be used that modulates one of the 355 nm beams to compensate for any changes of laser repetition rate. Since the $^{138}$Ba$^+$ qubit splitting is only a few megahertz, multiple comb teeth separations may not be needed for driving transitions on this qubit, and therefore, beat-note stabilization may not be necessary on 532 nm beams.

Figure 3:
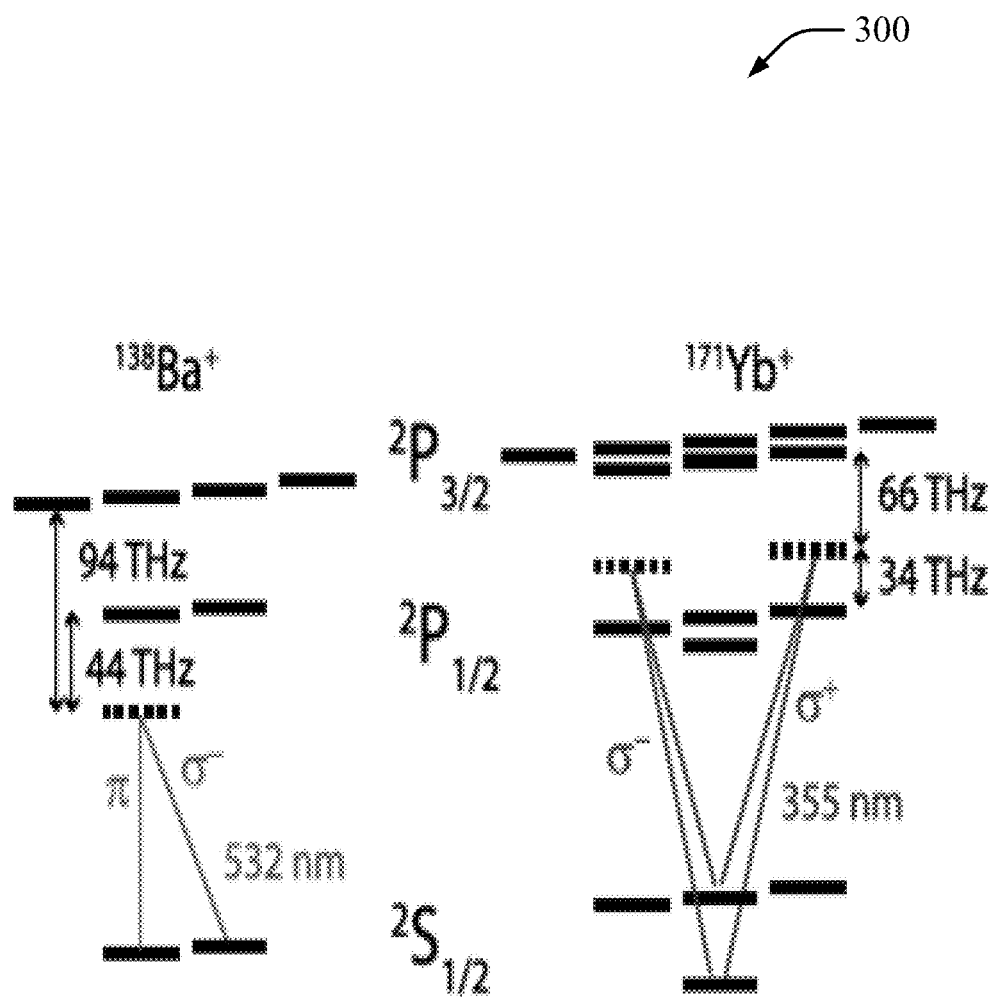
FIG. 3 is a diagram that illustrates an example of off-resonant couplings of 532 and 355 nm pulsed laser beams to $^2P_{1/2}$ and $^2P_{3/2}$ levels in both $^{138}Ba^+$ and $^{171}Yb^+$ in accordance with aspects of this disclosure.

Referring back to FIG. 3, there is shown off-resonant couplings of 532 and 355 nm pulsed laser beams to $^2P_{1/2}$ and $^2P_{3/2}$ levels in both the $^{138}$Ba$^+$ and the $^{171}$Yb$^+$ atomic systems to drive stimulated Raman transitions, with polarizations indicated. The splittings shown in FIG. 3 are provide for purposes of illustration and need not be shown to scale.

While the 355 nm radiation nominally couples only to the $^{171}$Yb$^+$ qubit and the 532 nm to the $^{138}$Ba$^+$ qubit, there is a small amount of cross-talk coupling to the other atomic system. For equal intensities and without regard to the comb spectrum or the light polarization, the $^{171}$Yb$^+$ system may feel an effective Rabi frequency from the 532 nm radiation that is ~2.6% of the nominal 355 nm radiation Rabi frequency. Likewise, the $^{138}$Ba$^+$ system may feel an ~11% Rabi frequency from the 355 nm radiation. The required laser polarization and frequency comb spectrum, however, are different for the two atomic qubit transitions, and these aspects may be used to reduce cross talk to much less than 1% between the two systems. The spontaneous Raman scattering rate per qubit Rabi cycle may be less than $10^{-5}$ for both atomic species, resulting in an error of less than $10^{-5}$ ($10^{-4}$) on single (two-)qubit gates. Rare spontaneous scattering in the $^{138}$Ba$^+$ system from 532 nm appears to optically pump the $^{138}$Ba$^+$ system through the $^2P_{3/2}$ level to the metastable $^2D_{5/2}$ state, which has a lifetime of 32 seconds. These rare pumping events may be overcome by, for example, illuminating the ions with a diffuse 1 Watt, orange light-emitting diode (centered around 617 nm) that excites the $^2D_{5/2}$ to $^2P_{3/2}$ transition at 614 nm with enough intensity to return the ion to the ground state in approximately 30 milliseconds.

Despite their similar atomic masses, the transverse motion of a coupled pair of $^{138}$Ba$^+$ and $^{171}$Yb$^+$ ions exhibits a large mismatch in their amplitude for a given mode, resulting in a smaller motional coupling between the ions, as illustrated in a diagram 400 in FIG. 4(a), described in more detail below. For this reason, the better-matched axial modes may be used instead, as illustrated in a diagram 450 in FIG. 4(b), described in more detail below. As the number of ions in the crystal chain increases, the motional eigenvector mismatch in the transverse modes becomes less significant and these modes can be used conveniently to benefit from higher mode frequencies.

Figure 4A:
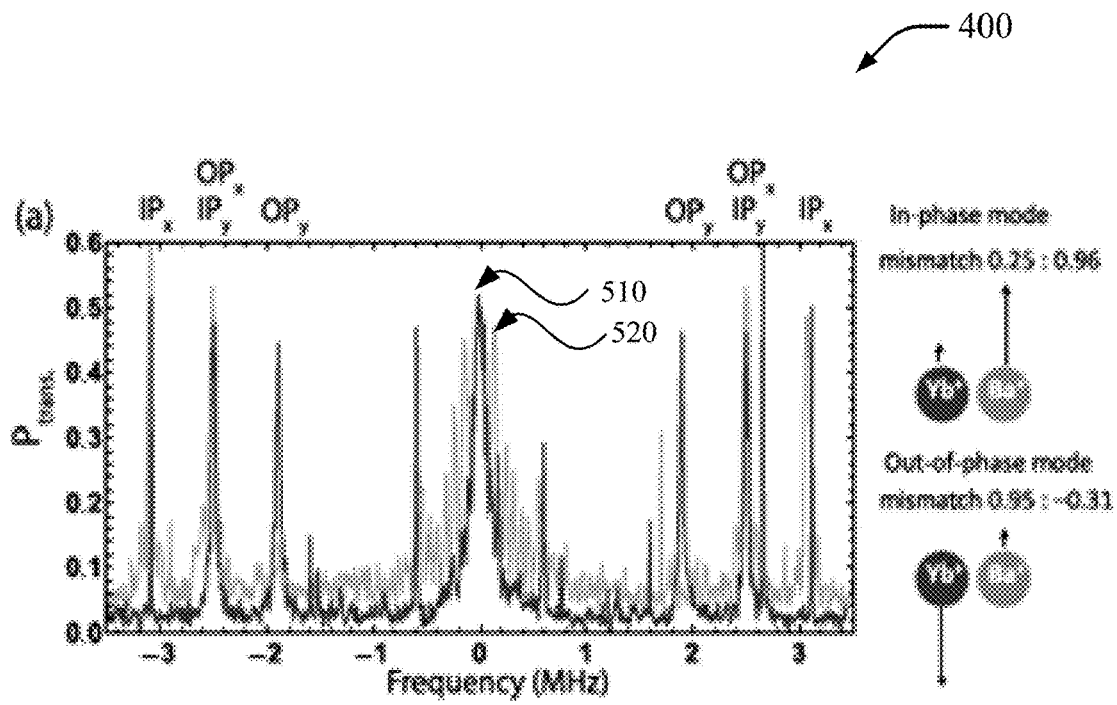
FIGS. 4(a) and 4(b) are diagrams that illustrate examples of vibrational spectrum of a co-trapped $^{138}Ba^+$-$^{171}Yb^+$ crystal for transvers and axial directions of motion, in accordance with aspects of this disclosure.
Figure 4B:
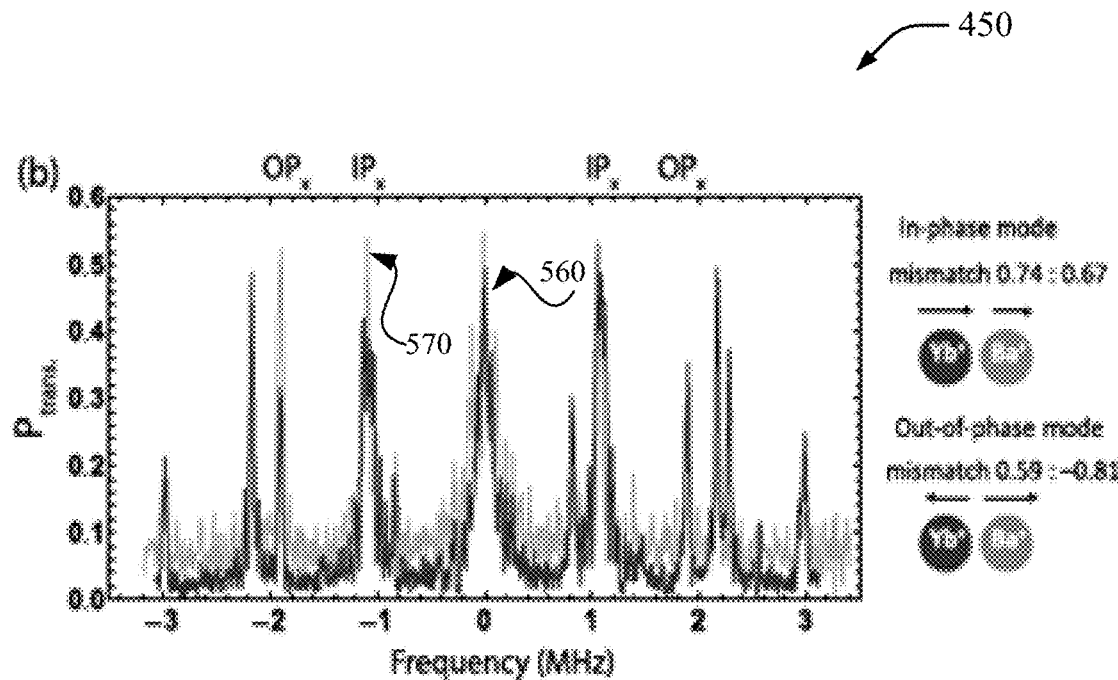

FIGS. 4(a) and 4(b) shows a Raman sideband vibrational spectrum of a co-trapped $^{138}$Ba$^+$–$^{171}$Yb$^+$ crystal for transverse (FIG. 4(a)) and axial (FIG. 4(b)) directions of motion. The measured probability of changing the qubit state is plotted in light blue for $^{138}$Ba$^+$ and in dark purple for $^{171}$Yb$^+$, as a function of detuning from the carrier transition where the shared motional phonon state is preserved. The peaks on the positive (negative) values correspond to a blue-(red-) sideband transition in which the spin flip is accompanied by the addition (subtraction) of a phonon. The sidebands corresponding to the in-phase (IP) and out-of-phase (OP) are labeled for the transverse (x,y) and axial (z) directions of motion, with their theoretical eigenvector amplitudes indicated at the right. The unlabeled peaks correspond to higher order sidebands, and interactions involving multiple modes such as subtraction of a phonon from one mode and addition in another.

Figure 5A:
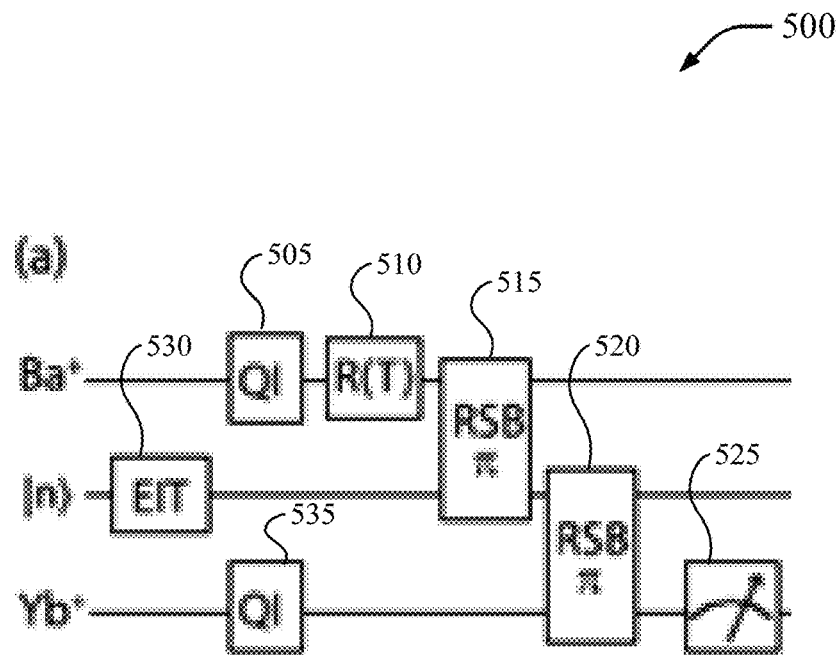
FIGS. 5(a) and 5(b) are diagrams that illustrate examples of experimental steps and results of mapping the state of $^{138}Ba^+$ to $^{171}Yb^+$ using collective motion directly, in accordance with aspects of this disclosure.
Figure 5B:
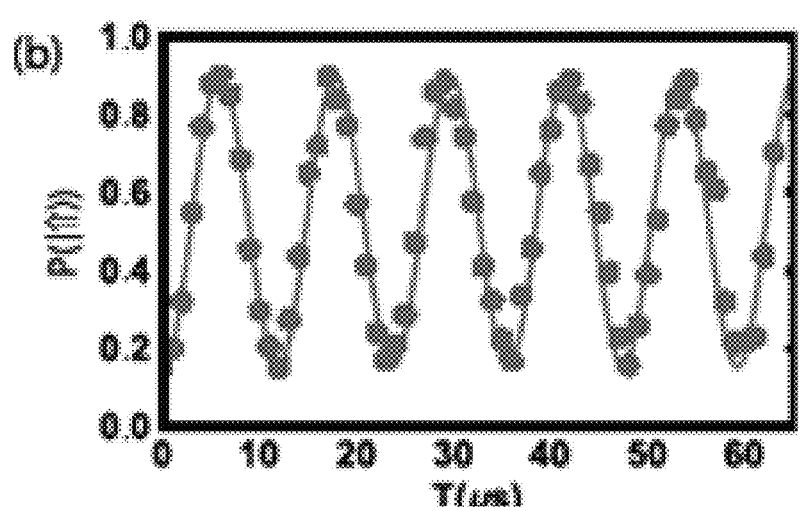

At first, the qubit state of $^{138}$Ba$^+$ is transferred to $^{171}$Yb$^+$ by directly using the collective motion in a Cirac-Zoller (CZ) mapping scheme. The procedure, which is illustrated in a diagram 500 in FIG. 5(a) described in more detail below, starts with EIT cooling and preparation of the $^{138}$Ba$^+$ spin state with a carrier transition. Next, a red-sideband π rotation on the $^{138}$Ba$^+$ system transfers information to a shared phonon mode, which is then transferred to the $^{171}$Yb$^+$ qubit with a further red-sideband π rotation on the $^{171}$Yb$^+$ system. The overall state transfer efficiency of 0.75, as shown in a diagram 550 in FIG. 5(b) described in more detail below, was limited primarily by the purity of the initial motional state. But the main drawback to the CZ method is the necessity of phase coherence between the communication qubit and the CZ mapping operations. Because the communication qubit may have prior entanglement through the photonic channel, the CZ mapping method requires stabilizing the beam paths to much better than an optical wavelength.

Referring back to FIG. 5(a), the diagram 500 shows details of the experimental steps described above for mapping the state of $^{138}$Ba$^+$ to $^{171}$Yb$^+$ using collective motion directly. As noted above, the procedure starts with EIT cooling (530), followed by the initialization of qubit states (QI) to $|\downarrow\rangle$ and $|\Downarrow\rangle$ (505, 535). After the initialization, a stimulated Raman rotation R(T) (510) of the $^{138}$Ba$^+$ qubit over time T prepares the state to be transferred. A red-sideband π rotation (RSB π) (515) on the $^{138}$Ba$^+$ qubit transfers this information to a shared phonon mode, which is then transferred to the $^{171}$Yb$^+$ qubit with another red-sideband π rotation (520). In a final step, the $^{171}$Yb$^+$ qubit state may be measured (525).

Referring back to FIG. 5(b), the diagram 550 shows data representing the probability of finding a $^{171}$Yb$^+$ qubit in $|\Uparrow\rangle$ as a function of the $^{138}$Ba$^+$ qubit rotation time T, with an observed state transfer efficiency of ≈0.75.

In addition to the features described above, a Mølmer-Sørensen (MS) transfer method is described that relaxes the above limitations. In the MS transfer scheme, entanglement and state transfer fidelity require only confinement to the Lamb-Dicke limit, which may be achieves with 300 μs of Doppler cooling followed by 500 μs of EIT cooling. A MS entangling gate may be realized in the system described herein by simultaneously addressing the axial out-of-phase mode with a symmetric detuning δ using pairs of non-copropagating Raman beams. Since the pulse pairs of 355 and 532 nm follow different paths, they are not necessarily incident on the atoms at the same time. Importantly, a temporal overlap between these pairs is not necessary for the MS interaction. Spin-dependent forces using the Raman beams can be applied at different times to each atom. The outcome is just a static phase on the entangled state which can be controlled by adjusting either the optical path lengths or the difference between the radio frequency (RF or rf) beatnote phases of the 355 and 532 nm driving fields. These spin-dependent forces displace the motional wave packets of certain two-qubit states in phase space. Walsh modulation may be incorporated to suppress frequency and timing errors, and, after a gate time T=200 μs with a detuning of δ=10 kHz, the motion returns to its original state, picking up a geometrical phase as in the usual MS gate. The optical intensities of the driving fields are adjusted to obtain carrier Rabi frequencies of $\Omega=\delta/4\eta$ to result in a π/2 geometrical phase after the MS interaction, where η is the Lamb-Dicke parameter. We find the correct optical force phase by monitoring the acquired geometrical phases. To maintain a shot-to-shot relative optical force phase, the same arbitrary waveform generator may be used to drive acousto-optic modulators for the 355 and 532 nm laser beams. The fidelity of this operation is approximately $\mathcal{F}=0.60$, as shown in FIGS. 6(a) and 6(b), and this low fidelity may be attributed to, for example, excessive heating ($\bar{n}$≈5 ms$^{-1}$) of the axial out-of-phase mode.

Figure 6A:
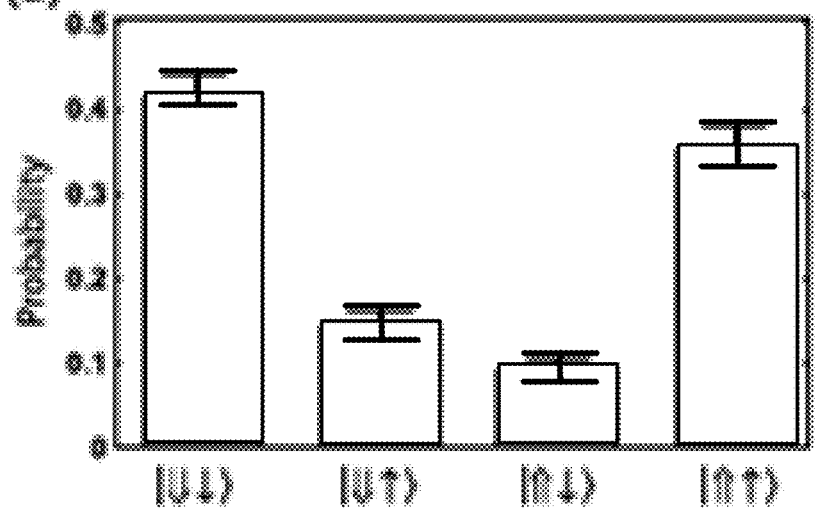
FIGS. 6(a) and 6(b) are diagrams that illustrate examples of measure probabilities of the $^{171}Yb$ and $^{138}Ba^+$ qubit states after an entangling MS gate and $\pi/2$ rotation following the MS interaction, in accordance with aspects of this disclosure.

FIG. 6(a) shows a diagram 600 that illustrates measured probabilities of the $^{171}$Yb$^+$ and $^{138}$Ba$^+$ qubit states after an entangling MS gate is applied to the initial $|\Downarrow\downarrow\rangle$ state. This interaction would ideally create the maximally entangled $(1/\sqrt{2})(|\Downarrow\downarrow\rangle-e^{-\Phi_s}|\Uparrow\uparrow\rangle)$ state. The optical phases of the driving fields are imprinted on spins with the gate phase, $\phi_s$.

Figure 6B:
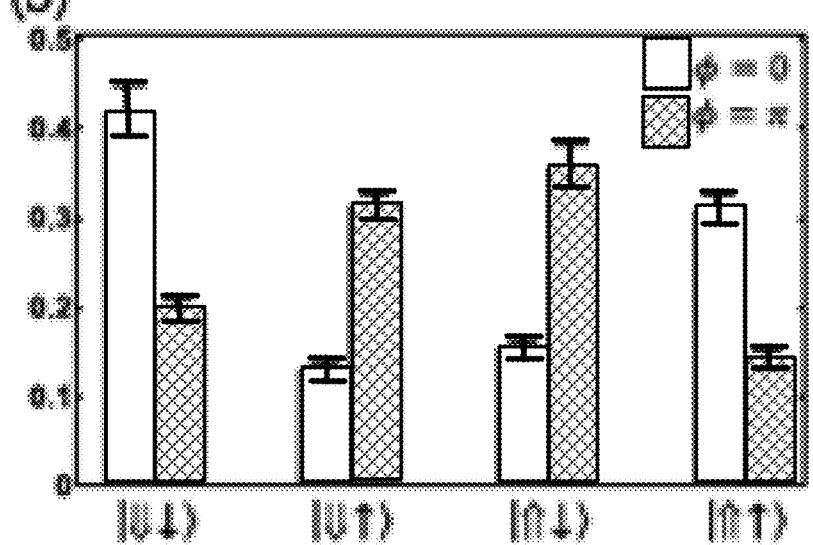

FIG. 6(b) shows a diagram 650 following the MS interaction, where π/2 rotations are applied to both qubits. The phase of the $^{138}$Ba$^+$ π/2 pulse is kept constant, while the $^{171}$Yb$^+$ π/2 rotation phase is scanned. The data shows measured qubit state probabilities at the maximum parity points $|P(|\Downarrow\downarrow\rangle)+P(|\Uparrow\uparrow\rangle)-P(|\Downarrow\uparrow\rangle)-P(|\Uparrow\downarrow\rangle)|$.

Even though the phases of the optical fields are imprinted on the entangled state after this interaction, two consecutive MS gates with a relative π phase difference can be used to coherently transfer the information from communication qubit (e.g., $^{138}$Ba$^+$ qubit) to memory qubit (e.g., $^{171}$Yb$^+$ qubit) without imprinting an extra optical phase. Thus, phase coherence between remote and local entanglement operations in the quantum network can be established without a need for directly eliminating optical phase dependence from the MS gate with extra single qubit operations or special beam geometries.

Based on the various techniques and aspects described in this disclosure, it is possible to extend a quantum network to many nodes using photonic Bell state analyzers to make the photonic connections. Considerable improvements on the atom-photon and atom-atom entanglement fidelities and rates are possible in order to scale to many interconnected nodes. First, the encoding of photonic qubits into two different frequencies rather than into polarization is expected to provide significant improvements in the remote communication qubit fidelity. Second, the use of fabricated chip traps with integrated optical elements is expected to enhance the connection rate between nodes. Additionally, the positional stability of the ions stemming from the uniformity and repeatability of construction, as well as heating rates comparable to hand assembled traps (such as the Sandia National Laboratories high-optical-access microfabricated ion trap with $\bar{n}$≈40 s$^{-1}$), would likely allow for much higher fidelity motional gates between memory and communication qubits in these fabricated traps.

Additional aspects related to the multispecies ion trap network described above are presented below. For example, a quantum networking node (e.g., nodes 110a, 110b, and 110c in FIG. 1) for use in a modular optical architecture for quantum computing can include multiple memory qubits (e.g., memory qubits 115), each memory qubit being based on a $^{171}$Yb$^+$ atomic ion, and one or more communication qubits (e.g., communication qubits 125), each communication qubit being based on a $^{138}$Ba$^+$ atomic ion. The multiple memory qubits and the one or more communication qubits may be part of a lattice in an atomic ion trap (see e.g., ion trap 870 in FIG. 8). In an example, the lattice can be a linear lattice.

In an aspect of such a quantum networking node, a localized connection between the $^{171}$Yb$^+$ atomic ion of one of the memory qubits and the $^{138}$Ba$^+$ atomic ion of one of the communication qubits is made through coupling of the one memory qubit and the one communication qubit by at least partially controlling their collective motion through external laser fields configured to apply forces to the $^{171}$Yb$^+$ atomic ion of the one memory qubit, the $^{138}$Ba$^+$ atomic ion of the one communication qubit, or both. For example, the atomic ion trap can be configured to receive a single laser, a second harmonic of the single laser corresponds to a first external laser field that applies forces to the $^{138}$Ba$^+$ atomic ion of the one communication qubit, and a third harmonic of the single laser corresponds to a second external laser field that applies forces to the $^{171}$Yb$^+$ atomic ion of the one memory qubit. Moreover, the second harmonic of the single laser is at an emission line of a wavelength of approximately 532 nm, and wherein the third harmonic of the single laser is at an emission line of a wavelength of approximately 355 nm.

In another aspect of such a quantum networking node, the $^{171}$Yb$^+$ atomic ion is a first atomic species, the $^{138}$Ba$^+$ atomic ion is a second atomic species, and an atomic mass of the first atomic species and an atomic mass of the second atomic species are substantially similar, with an atomic mass difference between the two atomic masses of less than 25%.

Figure 7A:
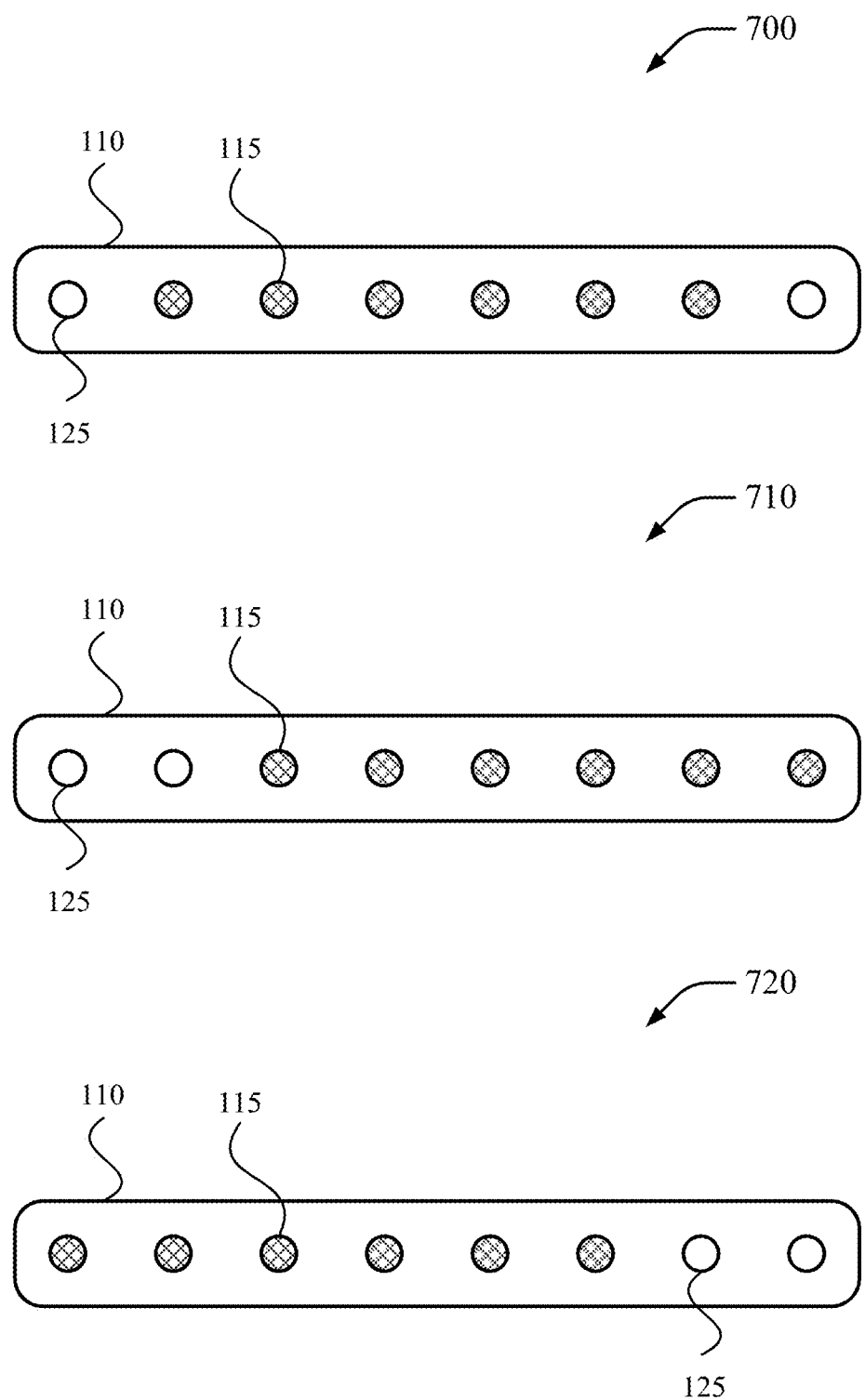
FIGS. 7(a)-7(c) are diagrams that illustrate examples of network nodes, photonic entanglers, and wavelength converters, in accordance with aspects of this disclosure.

In another aspect of such a quantum networking node, the one or more communication qubits include multiple communication qubits, and the quantum networking node is configured to multiplex between the multiple communication qubits to enable repeated trials of photon emission from the multiple communication qubits. Moreover, the one or more communication qubits include multiple communication qubits positioned at one end of the lattice, at another end of the lattice, or at both ends of the lattice. For example, FIG. 7(a) shows diagrams 700, 710, and 720 that illustrate examples of a node 110 having multiple communication qubits 125. The diagram 700 shows a node 110 with multiple communication qubits (e.g., communication bits 125), where at least one communication qubits is positioned at each end of a lattice (which also includes memory qubits 115). The diagram 710 shows a node 110 with multiple communication qubits (e.g., communication qubits 125) at one end of a lattice (which also includes memory qubits 115). The diagram 720 shows a node 110 with multiple communication qubits (e.g., communication qubits 125) at another end of a lattice (which also includes memory qubits 115).

In another aspect of such a quantum networking node, the $^{138}Ba^+$ atomic ion of any one of the one or more communication qubits is configured to emit a photon through fluorescence, the emitted photon being entangled with the $^{138}Ba^+$ atomic ion. In an example, at least a portion of a spectrum of the emitted photon is in the visible spectrum. The emission lines of the emitted photon can be isolated from a resonance of the $^{171}Yb^+$ atomic ions of the multiple memory qubits. The emission lines can include emission lines at wavelengths of approximately 493 nm and 650 nm, and wherein the resonance of the $^{171}Yb^+$ atomic ions is at a wavelength of approximately 369 nm. The emission lines at wavelengths of approximately 493 nm and 650 nm can correspond to visible optical lines connecting electronic ground-level Zeeman qubit states of the $^{138}Ba^+$ atomic ion to excited states.

In another aspect of such a quantum networking node, each memory qubit can be configured to be encoded in the $^2S_{1/2}$ ground state hyperfine level of the respective $^{171}Yb^+$ atomic ion. A hyperfine state coherence time of the respective $^{171}Yb^+$ atomic ion is approximately 1.5 seconds or greater. The splitting of hyperfine qubit states of the respective $^{171}Yb^+$ atomic ion is highly insensitive to magnetic field fluctuations (much less than the electron magnetic moment or "Bohr Magneton" of 1.4 MHz/Gauss). Moreover, each memory qubit can be further configured for initialization and detection without having to shuttle atomic state population between hyperfine levels.

In another aspect of such a quantum networking node, each communication qubit can be configured to use the $^2S_{1/2}$ ground state electron spin levels of the $^{138}Ba^+$ atomic ion.

Another example related to the multispecies ion trap network described above can be a quantum computing system having a modular optical architecture that can include multiple quantum networking nodes (e.g., nodes 110a, 110b, and 110c in FIG. 1), where each quantum networking node includes multiple memory qubits (e.g., memory qubits 115), each memory qubit being based on a $^{171}Yb^+$ atomic ion, and one or more communication qubits (e.g., communication qubits 125), each communication qubit being based on a $^{138}Ba^+$ atomic ion. The multiple memory qubits and the one or more communication qubits can be part of a lattice in an atomic ion trap (see e.g., ion trap 870 in FIG. 8). The one or more communication qubits in each of the multiple quantum networking nodes include multiple communication qubits positioned at one end of the lattice, at another end of the lattice, or at both ends of the lattice (see e.g., FIG. 7(a)). The system can further include a photonic entangler (e.g., photonic entangler 120 in FIG. 1) coupled to each of the multiple quantum networking nodes.

In an aspect of such a quantum computing system, each memory qubit in each of the multiple quantum networking nodes is configured to be encoded in the $^2S_{1/2}$ ground state hyperfine level of the respective $^{171}Yb^+$ atomic ion.

In another aspect of such a quantum computing system, each communication qubit in each of the multiple quantum networking nodes is configured to use the $^2S_{1/2}$ ground state electron spin levels of the $^{138}Ba^+$ atomic ion.

In another aspect of such a quantum computing system, a first communication qubit of the one or more communication qubits of a first quantum networking node of the multiple quantum networking nodes is entangled with one of the one or more communication qubits in a second quantum networking node of the multiple quantum networking nodes. Moreover, a second communication qubit of the one or more communication qubits of the first quantum networking node is entangled with one of the one or more communication qubits in a third quantum networking node of the multiple quantum networking nodes.

Figure 7B:
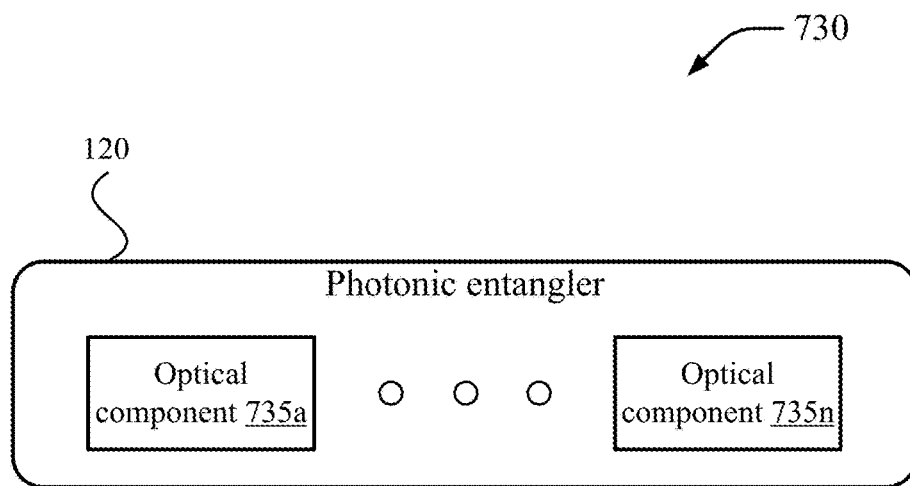
Figure 7C:
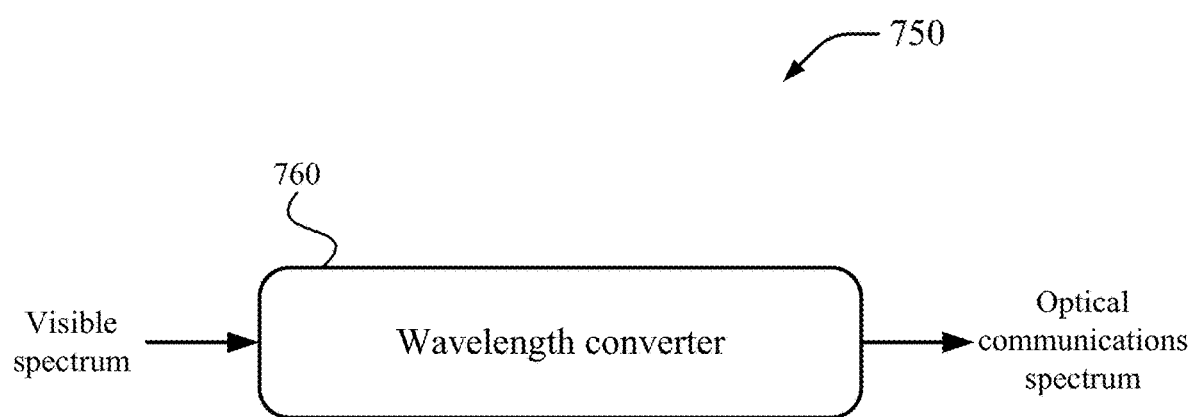

In another aspect of such a quantum computing system, the $^{138}Ba^+$ atomic ion of any one of the one or more communication qubits in one of the multiple quantum networking nodes is configured to emit a photon through fluorescence, the emitted photon being entangled with the $^{138}Ba^+$ atomic ion. At least a portion of a spectrum of the emitted photon is in the visible spectrum. Moreover, the photonic entangler is coupled to each of the multiple quantum networking nodes via optical fibers configured to operate at an optical communications spectrum, the quantum computing system further comprising a wavelength converter to convert the visible spectrum of the emitted photon to the optical communications spectrum. In an example, the optical communications spectrum includes wavelengths of approximately 1300-1550 nm. The photonic entangler can include one or more optical components compatible with the optical communications spectrum. For example, the photonic entangler can include one or more reconfigurable optical switches to enable entanglement between any two quantum networking nodes from the multiple quantum networking nodes. FIGS. 7(b) and 7(c) respectively illustrate examples of a photonic entangler and a wavelength converter. For example, a diagram 730 in FIG. 7(b) shows the photonic entangler 120 having one or more optical components 735a, . . . , 735n, where these components can include, as described above, components compatible with the optical communications spectrum such as reconfigurable optical switches. A diagram 750 in FIG. 7(c) shows a wavelength converter 760 configured to convert light and/or photons carrying some form of information from the visible spectrum to the optical communications spectrum.

While the various examples of memory qubits 115 and communication qubits 125 have been described above in relation to $^{171}Yb^+$ memory qubits 115 and the $^{138}Ba^+$ communication qubits 125, respectively, it is to be understood that these examples are provided for purposes of illustration and not of limitation. The memory qubits 115 and the communication qubits 125 can be selected to be sufficiently different so that the communication qubits 125 do not affect the functionality of the memory qubits 115. This may be achieved by having the memory qubits 115 and the communication qubits 125 be (1) made of different ion species, (2) made of different isotopes of the same species, as long as there are sufficient differences, (3) choice of different qubit basis states (e.g., hyperfine states versus other types of states), or (4) a combination of the above.

For example, with respect to different ion species, Yb/Ba can be used as described above, but also Ca/Sr, Be/Mg, or a combination of any of these. Others may also include Cd, Zn, Al, etc. For these species, different isotopes may be used. For example, for Yb/Ba, any of 171Yb, 174Yb, 176Yb, or 172Yb, etc. and any of 138Ba, 137Ba, 133Ba, etc. can be used. For Ca/Sr, any of 40Ca, 43Ca, etc. and any of 88Sr, 87Sr, 86Sr, etc. can be used. For Be/Mg, 9Be and any of 24Mg, 25 Mg, 26Mg, etc. can be used.

The choice of each qubit when using the different ion species described above can be hyperfine (odd isotopes of each ion species), Zeeman (any of the species), or optical qubit (for Yb, Ba, Ca, Sr, and Mg, for example).

Also as described above, different isotopes of the same species can be used for memory qubits 115 and communication qubits 125. For example, two of 171Yb, 174Yb, 176Yb, or 172Yb, etc. can be used for memory and communication qubits, two of 138Ba, 137Ba, 133Ba, etc. can be used for memory and communication qubits, two of 40Ca, 43Ca, etc. can be used for memory and communication qubits, two of 88Sr, 87Sr, 86Sr, etc. can be used for memory and communication qubits, or two of 24Mg, 25 Mg, 26Mg, etc. can be used for memory and communication qubits.

Moreover, different nodes 110 can be made using different combinations of memory qubits 115 and communication qubits 125. For example, one node 110 can be made using one set of ion species (e.g., Yb/Ba) and another node 110 can be made using another set of ion species (e.g., Ca/Sr or Be/Mg). In another example, one node 110 can be made using one set of isotopes of the same species (e.g., different isotopes of Yb) and another node 110 can be made using another set of isotopes of the same species (e.g., different isotopes of Ca). Different combinations of nodes made of different sets of ion species, different sets of isotopes of the same species, and/or different qubit choice of qubit basis states (e.g., hyperfine) can be used as part of a multispecies ion trap network such as the one described above in the diagram 100 in FIG. 1

Figure 8:
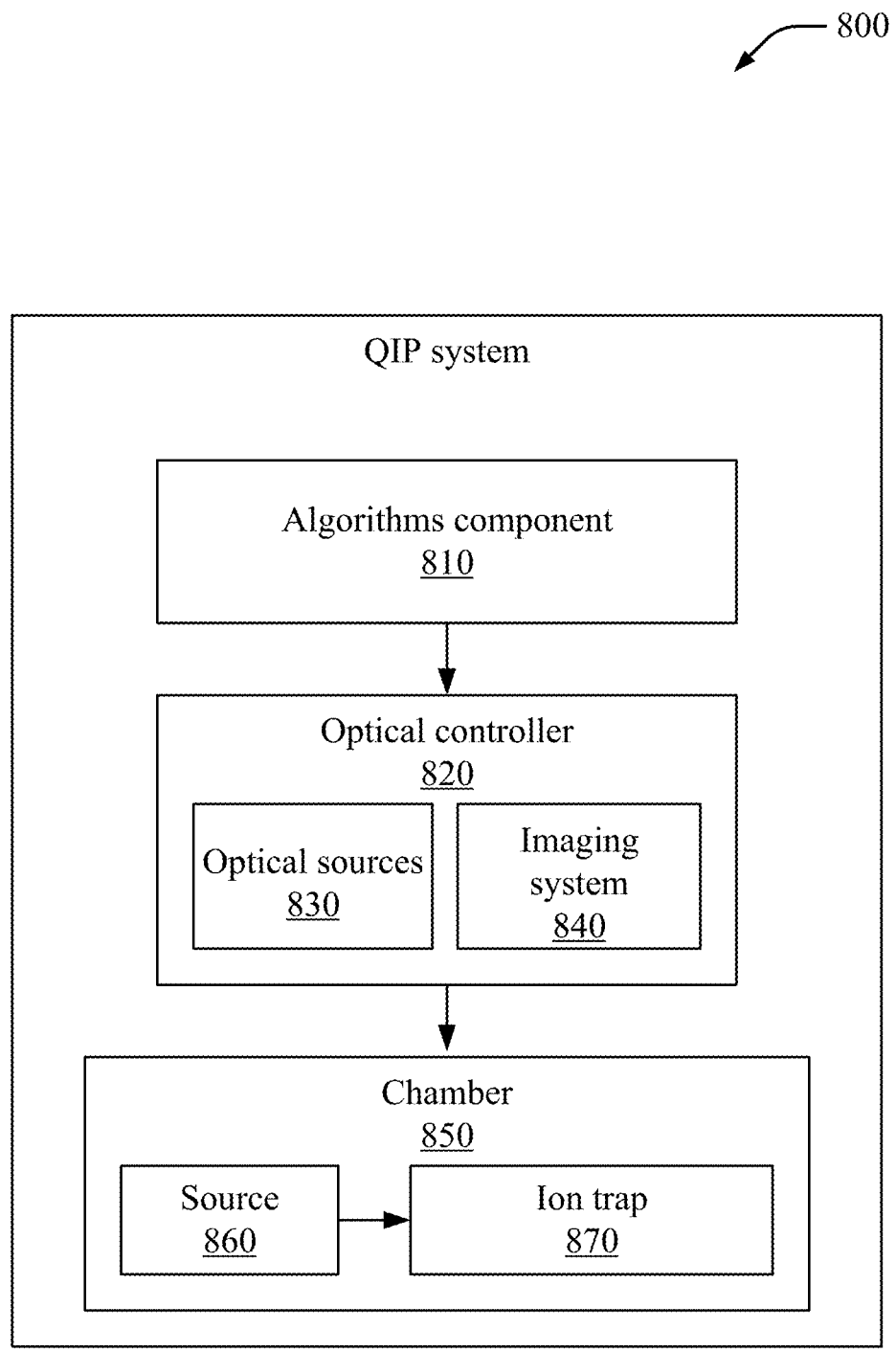
FIG. 8 is a block diagram that illustrates an example of a trapped-ion-based QIP system, in accordance with aspects of this disclosure.

FIG. 8 is a block diagram that illustrates an example of a QIP system 800 in accordance with aspects of this disclosure. The QIP system 800 may also be referred to as a quantum computing system, a quantum computing network, a computer device, or the like. In an aspect, the QIP system 800 may correspond to portions of the multispecies ion trap network in FIG. 1 or a quantum computer implementation of the computing device 900 in FIG. 9.

The QIP system 800 can include a source 860 that provides atomic species to a chamber 850 having an ion trap 870 that traps the atomic species once ionized by an optical controller 820. Optical sources 830 in the optical controller 820 may include one or more laser sources that can be used for ionization of the atomic species, control (e.g., phase control) of the atomic ions, for fluorescence of the atomic ions that can be monitored and tracked by image processing algorithms operating in an imaging system 1040 in the optical controller 1020, and/or for other aspects including those described above in connection with using multiple species in a trapped-ion node for quantum networking. The imaging system 840 can include a high resolution imager (e.g., CCD camera) for monitoring the atomic ions while they are being provided to the ion trap 870 (e.g., for counting) or after they have been provided to the ion trap 870 (e.g., for monitoring the atomic ions states). In an aspect, the imaging system 840 can be implemented separate from the optical controller 820, however, the use of fluorescence to detect, identify, and label atomic ions using image processing algorithms may need to be coordinated with the optical controller 820.

The QIP system 800 may also include an algorithms component 810 that may operate with other parts of the QIP system 800 (not shown) to perform quantum algorithms (e.g., QFT, quantum simulations) that make use of the implementations described above. The algorithms component 810 may provide instructions to various components of the QIP system 800 (e.g., to the optical controller 1020) to enable the implementation of quantum circuits, or their equivalents. That is, the algorithms component 810 may allow for mapping of different computing primitives into physical representations using, for example, the ion trap 870.

The QIP system 800 can implement one or more of the components or structures shown in the multispecies ion trap network in the diagram 100 in FIG. 1, as well as some or all or the components shown in FIGS. 7(a), 7(b), and 7(c).

Figure 9:
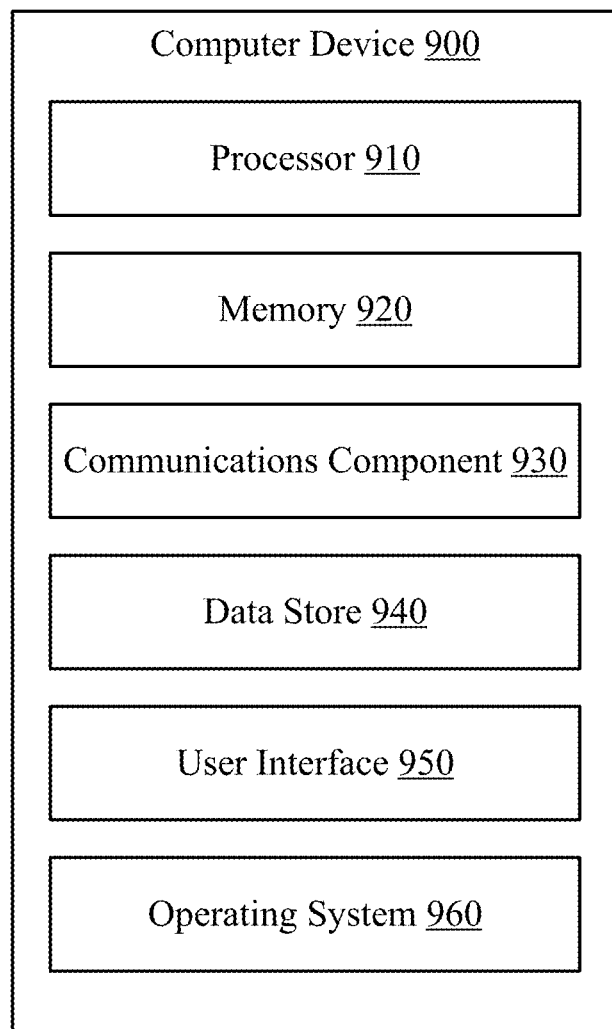
FIG. 9 is a diagram that illustrates an example of a computer device, in accordance with aspects of this disclosure.

Referring now to FIG. 9, illustrated is an example computer device 900 in accordance with aspects of the disclosure. The computer device 900 can represent a single computing device, multiple computing devices, a distributed computing system, or at least a portion of a computing network, for example. The computer device 900 may be configured as a quantum computer, a classical computer, or a combination of quantum and classical computing functions.

In one example, the computer device 900 may include a processor 910 for carrying out processing functions associated with one or more of the features described herein. The processor 910 may include a single or multiple set of processors or multi-core processors. Moreover, the processor 910 may be implemented as an integrated processing system and/or a distributed processing system. The processor 910 may include a central processing unit (CPU), a quantum processing unit (QPU), a graphical processing unit (GPU), or combination of those types of processors.

In an example, the computer device 900 may include a memory 920 for storing instructions executable by the processor 910 for carrying out the functions described herein. In an implementation, for example, the memory 920 may correspond to a computer-readable storage medium that stores code or instructions to perform one or more of the functions or operations described herein. In one example, the memory 920 may include one or more memory qubits.

Further, the computer device 900 may include a communications component 930 that provides for establishing and maintaining communications with one or more parties utilizing hardware, software, and services as described herein. The communications component 930 may carry communications between components on the computer device 900, as well as between the computer device 900 and external devices, such as devices located across a communications network and/or devices serially or locally connected to computer device 900. For example, the communications component 930 may include one or more buses, and may further include transmit chain components and receive chain components associated with a transmitter and receiver, respectively, operable for interfacing with external devices. Aspects of the communications component 930 may be used to implement the multispecies ion trap network shown in FIG. 1.

Additionally, the computer device 900 may include a data store 940, which can be any suitable combination of hardware and/or software, that provides for mass storage of information, databases, and programs employed in connection with implementations described herein. For example, the data store 940 may be a data repository for operating system 960 (e.g., classical OS, or quantum OS). In one implementation, the data store 940 may include the memory 920.

The computer device 900 may also include a user interface component 950 operable to receive inputs from a user of the computer device 900 and further operable to generate outputs for presentation to the user or to provide to a different system (directly or indirectly). The user interface component 950 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 950 may include one or more output devices, including but not limited to a display, a speaker, a haptic feedback mechanism, a printer, any other mechanism capable of presenting an output to a user, or any combination thereof.

In an implementation, the user interface component 950 may transmit and/or receive messages corresponding to the operation of the operating system 960. In addition, the processor 910 may execute the operating system 960 and/or applications or programs, and the memory 920 or the data store 940 may store them.

When the computer device 900 is implemented as part of a cloud-based infrastructure solution, the user interface component 950 may be used to allow a user of the cloud-based infrastructure solution to remotely interact with the computer device 900.

The computer device 900 can implement one or more of the components or structures shown in the multispecies ion trap network in the diagram 100 in FIG. 1, as well as some or all or the components shown in FIGS. 7(a), 7(b), and 7(c). For example, the communications component 930 can implement one or more of the nodes 110, the photonic entangler 120, and/or the wavelength converter 760.

Although the present disclosure has been provided in accordance with the implementations shown, one of ordinary skill in the art will readily recognize that there could be variations to the embodiments and those variations would be within the scope of the present disclosure. Accordingly, many modifications may be made by one of ordinary skill in the art without departing from the scope of the appended claims.

What is claimed is:

1. A quantum computing system having a modular optical architecture, comprising:
    one or more first quantum networking nodes, each of the first quantum networking nodes including:
        multiple memory qubits, and
        one or more communication qubits,
        the multiple memory qubits and the one or more communication qubits in each of the first quantum networking nodes being made from different isotopes of a same species;
    one or more second quantum networking nodes, where each of the second quantum networking nodes includes:
        multiple memory qubits, and
        one or more communication qubits,
        the multiple memory qubits and the one or more communication qubits in each of the second quantum networking nodes being made from different species; and
    a photonic entangler optically coupled to each of the one or more first quantum networking nodes and each of the one or more second quantum networking nodes.

2. The quantum computing system of claim 1, wherein the different isotopes of the same species include different Ba isotopes.

3. The quantum computing system of claim 2, wherein the different Ba isotopes are from multiple Ba isotopes including at least 138Ba, 137Ba, and 133Ba.

4. The quantum computing system of claim 1, wherein the different species include Yb as one species and Ba as another species.

5. The quantum computing system of claim 1, wherein each of the first quantum networking nodes includes an ion trap, and the multiple memory qubits and the one or more communication qubits of each of the first quantum networking nodes are ions trapped in the corresponding ion trap.

6. The quantum computing system of claim 1, wherein each of the second quantum networking nodes includes an ion trap, and the multiple memory qubits and the one or more communication qubits of each of the second quantum networking nodes are ions trapped in the corresponding ion trap.

7. The quantum computing system of claim 1, wherein one of the one or more communication qubits of one of the first quantum networking nodes is entangled with one of the one or more communication qubits of one of the second quantum networking nodes.

8. The quantum computing system of claim 1, wherein one of the one or more communication qubits of one of the first quantum networking nodes is entangled with one of the one or more communication qubits of another one of the first quantum networking nodes.

9. The quantum computing system of claim 1, wherein one of the one or more communication qubits of one of the second quantum networking nodes is entangled with one of the one or more communication qubits of another one of the second quantum networking nodes.

10. The quantum computing system of claim 1, wherein the photonic entangler is optically coupled to each of the one or more first quantum networking nodes and each of the one or more second quantum networking nodes via optical fibers configured to operate at an optical communications spectrum.

11. A quantum computing system having a modular optical architecture, comprising:
    one or more first quantum networking nodes, each of the first quantum networking nodes including:
        multiple memory qubits, and
        one or more communication qubits,
        the multiple memory qubits and the one or more communication qubits in each of the first quantum networking nodes being made from a first set of different species;
    one or more second quantum networking nodes, where each of the second quantum networking nodes includes:
        multiple memory qubits, and
        one or more communication qubits,
        the multiple memory qubits and the one or more communication qubits in each of the second quantum networking nodes being made from a second set of different species different from the first set of different species; and
    a photonic entangler optically coupled to each of the one or more first quantum networking nodes and each of the one or more second quantum networking nodes.

12. The quantum computing system of claim 11, wherein the first set of different species includes Yb as one species and Ba as another species.

13. The quantum computing system of claim 11, wherein each of the first quantum networking nodes includes an ion trap, and the multiple memory qubits and the one or more communication qubits of each of the first quantum networking nodes are ions trapped in the corresponding ion trap.

14. The quantum computing system of claim 11, wherein each of the second quantum networking nodes includes an ion trap, and the multiple memory qubits and the one or more communication qubits of each of the second quantum networking nodes are ions trapped in the corresponding ion trap.

15. The quantum computing system of claim 11, wherein one of the one or more communication qubits of one of the first quantum networking nodes is entangled with one of the one or more communication qubits of one of the second quantum networking nodes.

16. A quantum computing system having a modular optical architecture, comprising:
   one or more first quantum networking nodes, each of the first quantum networking nodes including:
      multiple memory qubits, and
      one or more communication qubits,
      the multiple memory qubits and the one or more communication qubits in each of the first quantum networking nodes being made from different isotopes of a same first species;
   one or more second quantum networking nodes, where each of the second quantum networking nodes includes:
      multiple memory qubits, and
      one or more communication qubits,
      the multiple memory qubits and the one or more communication qubits in each of the second quantum networking nodes being made from different isotopes of a same second species; and
   a photonic entangler optically coupled to each of the one or more first quantum networking nodes and each of the one or more second quantum networking nodes.

17. The quantum computing system of claim 16, wherein the different isotopes of the same first species includes a pair of different Ba isotopes, the pair of different Ba isotopes being from multiple Ba isotopes including at least 138Ba, 137Ba, and 133Ba.

18. The quantum computing system of claim 16, wherein each of the first quantum networking nodes includes an ion trap, and the multiple memory qubits and the one or more communication qubits of each of the first quantum networking nodes are ions trapped in the corresponding ion trap.

19. The quantum computing system of claim 16, wherein each of the second quantum networking nodes includes an ion trap, and the multiple memory qubits and the one or more communication qubits of each of the second quantum networking nodes are ions trapped in the corresponding ion trap.

20. The quantum computing system of claim 16, wherein one of the one or more communication qubits of one of the first quantum networking nodes is entangled with one of the one or more communication qubits of one of the second quantum networking nodes.

* * * * *